United States Patent
Quintero et al.

(10) Patent No.: US 9,945,974 B2
(45) Date of Patent: Apr. 17, 2018

(54) MULTI-VARIABLE WORKFLOW FOR CEMENT SHEATH EVALUATION AND CHARACTERIZATION

(71) Applicant: Halliburton Energy Services, Inc., Houston, TX (US)

(72) Inventors: Luis F. Quintero, Katy, TX (US); Ivo Foianini, Humble, TX (US); Javier Fadul, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 53 days.

(21) Appl. No.: 14/907,620

(22) PCT Filed: Sep. 4, 2015

(86) PCT No.: PCT/US2015/048467
§ 371 (c)(1),
(2) Date: Jan. 26, 2016

(87) PCT Pub. No.: WO2016/040141
PCT Pub. Date: Mar. 17, 2016

(65) Prior Publication Data
US 2016/0274260 A1    Sep. 22, 2016

Related U.S. Application Data

(60) Provisional application No. 62/048,435, filed on Sep. 10, 2014.

(51) Int. Cl.
*G01V 1/48* (2006.01)
*G01V 5/12* (2006.01)
(Continued)

(52) U.S. Cl.
CPC .............. *G01V 1/48* (2013.01); *G01V 1/306* (2013.01); *G01V 1/50* (2013.01); *G01V 5/12* (2013.01);
(Continued)

(58) Field of Classification Search
CPC . G01V 1/306; G01V 1/50; G01V 5/12; G01V 1/48; G01V 11/00; G01V 2210/6224; G01V 2210/6226; G01V 2210/6169
(Continued)

(56) References Cited

U.S. PATENT DOCUMENTS 3,815,677 A * 6/1974 Pennebaker, Jr. ... E21B 47/0005
166/253.1
5,089,989 A * 2/1992 Schmidt .............. E21B 47/0005
181/102
(Continued)

FOREIGN PATENT DOCUMENTS

WO    2011127156 A2    10/2011

OTHER PUBLICATIONS

"Standard deviation," Wikipedia, 2017, downloaded Aug. 27, 2017 from https://en.wikipedia.org/wiki/Standard_deviation, 22 pages.*
(Continued)

*Primary Examiner* — Daniel L Murphy
(74) *Attorney, Agent, or Firm* — McDermott Will & Emery LLP (57) ABSTRACT

Sonic data, ultrasonic data, and density data of the annulus are obtained using a sonic tool, an ultrasonic tool, and a density tool, respectively, included in a tool string. A first deconvolution operation is performed to obtain an amplitude, a frequency, and a phase of the modified sonic wave. A first inverse modeling operation results in a first density value of the annular media. A second deconvolution operation is performed to obtain an amplitude, a frequency, and a
(Continued)

phase of the modified ultrasonic wave. A second inverse modeling operation results in a second density value of the annular media. A third deconvolution operation is performed to obtain far counts, near counts, and an energy spectrum of gamma rays. A third inverse modeling operation results in a third density value of the annular media.

22 Claims, 7 Drawing Sheets

(51) Int. Cl.
    *G01V 1/30* (2006.01)
    *G01V 1/50* (2006.01)
    *G01V 11/00* (2006.01)
(52) U.S. Cl.
    CPC ...... *G01V 11/00* (2013.01); *G01V 2210/6169* (2013.01); *G01V 2210/6224* (2013.01); *G01V 2210/6226* (2013.01)

(58) Field of Classification Search
    USPC .......................................................... 367/28
    See application file for complete search history.

(56) References Cited

U.S. PATENT DOCUMENTS

| 5,274,604 | A | * | 12/1993 | D'Angelo | ................ | G01V 1/50 |
|---|---|---|---|---|---|---|
| | | | | | | 367/35 |
| 6,173,606 | B1 | | 1/2001 | Mosley | | |
| 2004/0210393 | A1 | | 10/2004 | Ellis et al. | | |
| 2009/0225949 | A1 | | 9/2009 | Wraight et al. | | |
| 2014/0052376 | A1 | | 2/2014 | Guo et al. | | |

OTHER PUBLICATIONS

International Search Report and Written Opinion for PCT/US2015/048467 dated Nov. 27, 2015.

* cited by examiner

MULTI-VARIABLE WORKFLOW FOR CEMENT SHEATH EVALUATION AND CHARACTERIZATION

CROSS-REFERENCE TO RELATED APPLICATIONS

This application claims priority under 35 U.S.C. § 119 to Provisional Application No. 62/048,435 filed on Sep. 10, 2014, in the United States Patent and Trademark Office (USPTO).

BACKGROUND

Completing an oil or gas well often includes a cementing procedure that bonds one or more well casings that line a wellbore to a surrounding subterranean formation and bonds overlapping portions of the well casings with each other. In some wells, the cementing process extends from total depth to a surface location, while in others the cement is present only between certain depths. The cement forms an impermeable sheath that prevents the migration of fluids through the annulus surrounding the casing. The cement bonds further enhance the overall integrity of the well. A good cementing bonding and zonal isolation is particularly critical in the case of plug and abandonment operations, especially in deep water applications.

Typically, sonic tools (e.g., cement bond logging tools) or ultrasonic tools (e.g., an ultrasonic pulse-echo scanner) are used in the industry to evaluate the integrity of cement bonds between the formation and the casing. However, the evaluation in these cases uses raw data from only one system of sonic/ultrasonic sensors to infer the cement bonding parameters through indirect methods.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to the field of hydrocarbon production from subterranean wells and, more particularly, to methods of evaluating the integrity of bonds that adhere wellbore casing to a wellbore.

The present disclosure describes improved methods and systems for cement sheath evaluation and characterization that use sonic, ultrasonic, and density tools to provide a more direct and more accurate measurement of the integrity of the cement bond through the evaluation of cement-casing interface density and annular equivalent density due to the presence of water, oil or gas. Previous attempts to evaluate the quality of cement bonding were based on indirect methods that use data only from sonic and/or ultrasonic tools to determine cement parameters such as compressive strength or cement bond. Embodiments of the present disclosure provide more direct and accurate measurements of cement bond quality and cement sheath characterization using sonic, ultrasonic, and density tools. The presently described methods enhance the evaluation and characterization of cement sheaths without requiring investment in new tools, new tool hardware, or adaptations of existing tools.

Figure 1:
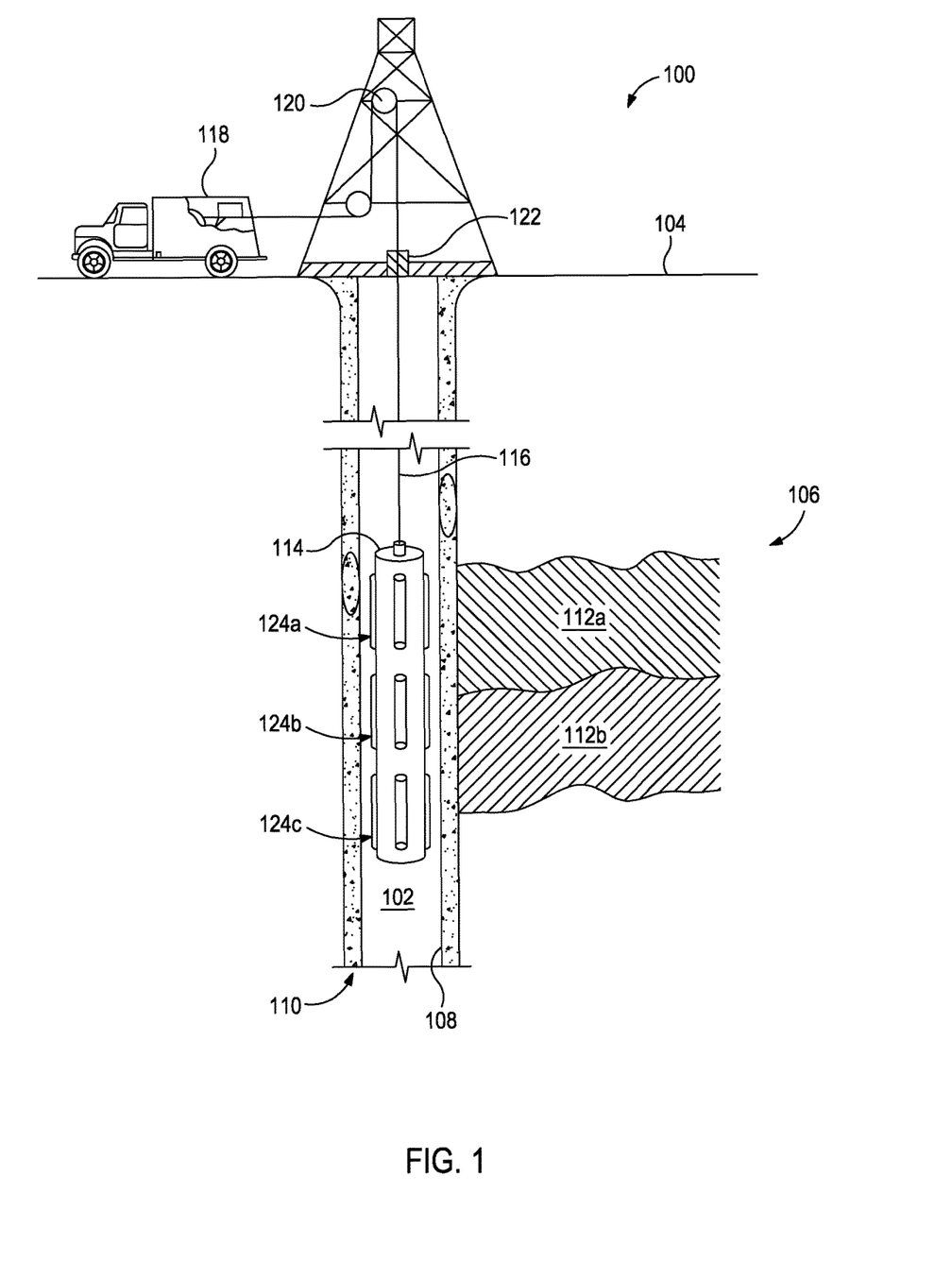
FIG. 1 is a well system that can employ the principles of the present disclosure.

FIG. 1 is a schematic of an exemplary well system 100 that may employ the principles of the present disclosure. As illustrated, a wellbore 102 has been drilled from a surface location 104 into a subterranean formation 106 containing hydrocarbons entrained therein. Set within the wellbore 102 is a string of casing 108 bonded to the inner surface of the wellbore 102. The casing 108 is bonded within the wellbore 102 by flowing cement 110 into the annulus formed between the outer diameter of the casing 108 and the inner diameter of the wellbore 102. The resulting cement bond not only adheres the casing 108 within the wellbore 102, but also serves to isolate adjacent zones (112a and 112b) within the formation 106 from one another. Isolating the adjacent zones 112a,b can be important when one of the zones 112a,b contains oil or gas and the other zone includes a non-hydrocarbon fluid, such as water. Should the cement 110 surrounding the casing 108 be defective and fail to provide isolation of the adjacent zones 112a,b, water or other non-hydrocarbon fluids can migrate into the hydrocarbon producing zone, thus diluting or contaminating the hydrocarbons within the producing zone. Additionally, defective cement 110 can result in the fluids from the zones 112a,b migrating to the surface location 104 through the annulus surrounding the casing 108.

To detect possible defective cement bonds, a tool string 114 may be introduced into the wellbore 102 on a conveyance 116, such as wireline or slickline. Other suitable conveyances can include, however, drill pipe, coiled tubing, a downhole tractor, production tubing, and the like. In some embodiments, the conveyance 116 may be connected to a surface processing unit 118, which in FIG. 1 is depicted as a truck, via a pulley system 120 and fed into the wellbore 102 via a wellhead installation 122, such as a lubricator or the like. The tool string 114 may include one or more wireline logging tools developed for analyzing the integrity of the cement 110 bonding the casing 108 to the wellbore 102. As illustrated, for instance, the tool string 114 may include a sonic tool 124a, an ultrasonic tool 124b, and a bulk density tool 124c. The sonic tool 124a may be one of a cement bond log (CBL) tool, a radial cement bond log (RCBL) tool, and an open-hole mono-pole sonic tool. The ultrasonic tool 124b may be one of an ultrasonic pulse-echo scanner and a flexural scanner. The bulk density tool 124c may be an open-hole nuclear density porosity tool.

Figure 2:
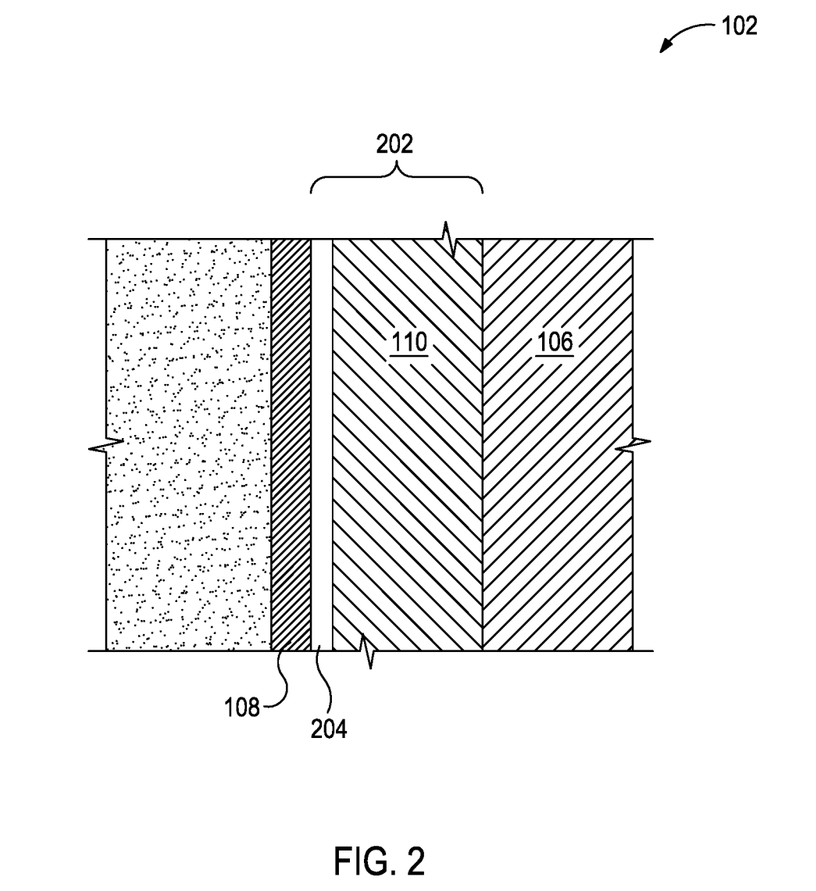
FIG. 2 depicts an enlarged cross-sectional view of a portion of the wellbore of FIG. 1.

FIG. 2 depicts an enlarged cross-sectional view of a portion of the wellbore 102 of FIG. 1 lined with the casing 108. As illustrated, an annulus 202 is defined between the outer diameter of the casing 108 and the formation 106, and the cement 110 is disposed within the annulus 202. A casing-cement interface 204 is provided at the outer diameter of the casing 108.

Figure 3:
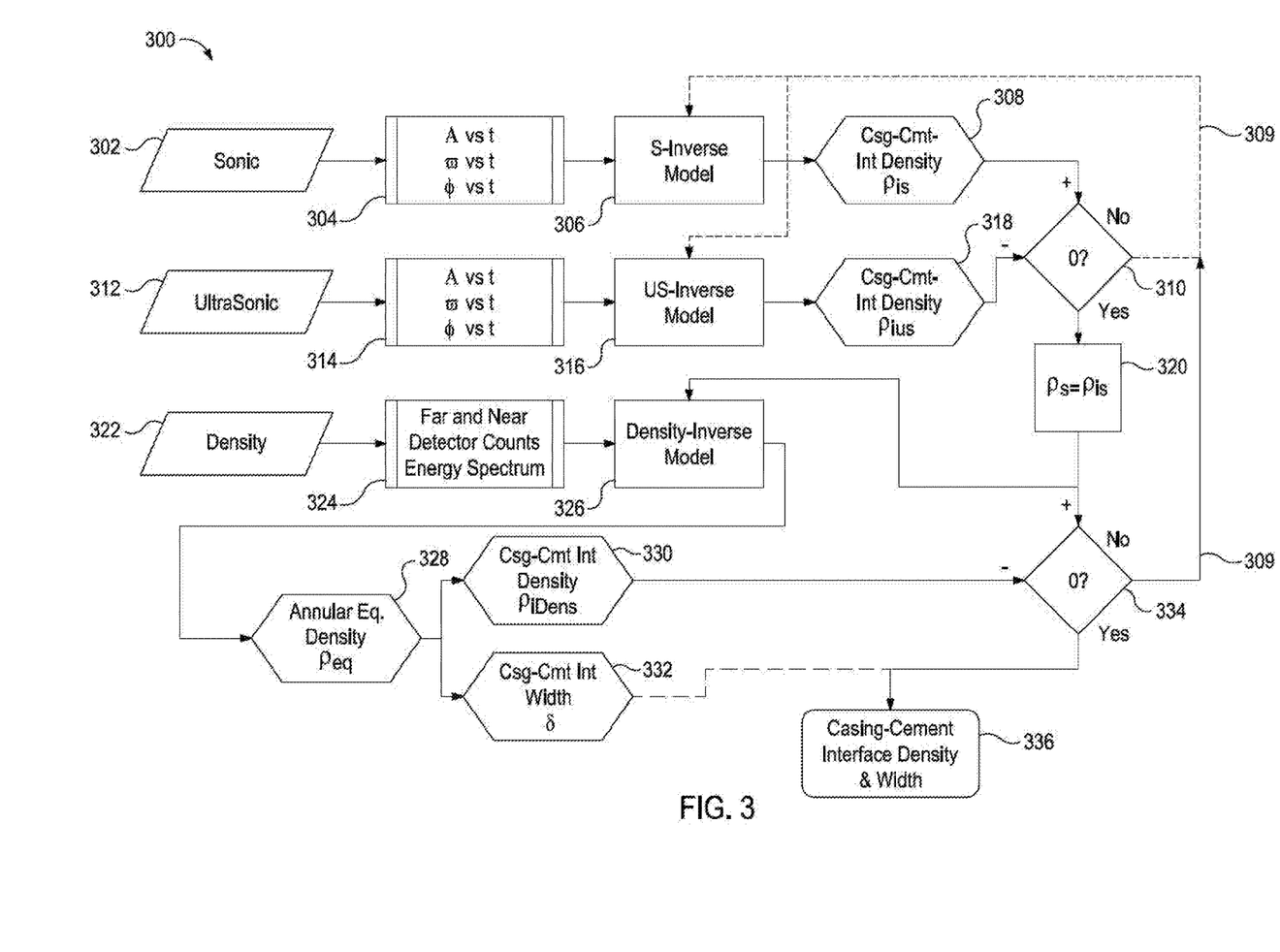
FIG. 3 depicts an exemplary workflow method.

FIG. 3 depicts an exemplary workflow method 300, according to the present disclosure. As illustrated, the workflow method 300 operates with the input of sonic data, ultrasonic data, and density data, which may be acquired through operation of the sonic tool 124a, the ultrasonic tool 124b, and the bulk density tool 124c, respectively, of the tool string 114 of FIG. 1.

At 302, the sonic tool 124a obtains sonic data from the media present within the annulus 202 (FIG. 2), which, for instance, may be characterized as the cement 110 (FIG. 2) in the annulus 202. Briefly, the sonic tool 124a operates by emitting an acoustic wave (also referred to as a sonic acoustic wave or a sonic wave) into the wellbore 102 and the formation 106. The sonic wave interacts with the media within the annulus (also referred to as the annular media), and characteristics of the sonic wave are thereby modified according to the physical properties of the annular media. For instance, an amplitude (A), frequency ($\omega$), and/or phase ($\varphi$) of the sonic wave may be modified and at least a portion of the modified sonic wave is reflected back to the sonic tool 124a, thereby resulting in the sonic data.

A deconvolution operation may then be performed on the sonic data, as at 304, to obtain amplitude (A), frequency ($\omega$), and/or phase ($\varphi$) of the modified sonic wave. The de-convoluted amplitude (A), frequency ($\omega$), and phase ($\varphi$) may then be provided to a sonic-inverse (S-inverse) model, as at 306. The S-inverse model calculates the density value of the annular media, as at 308.

As is known, acoustic impedance is a product of acoustic wave velocity and media density. The S-inverse model of 306 may be configured to predict the acoustic impedance of the annular media and then calculate the density thereof based on the ratio of the predicted acoustic impedance. The density of the cement may be a known value. The sonic tool 124a determines the density of the annular media based on the modified sonic wave. The S-inverse model compares the density of the annular media as obtained by the S-inverse model with the density of the annular media as determined by the sonic tool 124a. If the difference in these two density values is within a desired proximity of each other (based on a predetermined standard deviation, for example), the density calculated by the S-inverse model is considered as the equivalent density measurement for the media present within the annulus 202. If the difference in the two density values is not within the desired proximity, however, the S-inverse model may then be configured to predict new values of the acoustic impedance of the annular media and recalculate the density using the new predictions. The process iteratively repeats until the two density values are obtained within the desired proximity of each other.

The ultrasonic tool 124b operates in a similar manner as the sonic tool, except that the acoustic wave (referred herein as an ultrasonic acoustic wave or an ultrasonic wave) emitted by the ultrasonic tool 124b has a higher frequency than the acoustic wave emitted by the sonic tool 124a. Because of higher frequency, the ultrasonic wave may have a relatively smaller depth of investigation and may not travel as deep as the sonic wave. For instance, the ultrasonic wave may at most traverse the casing-cement interface 204 (FIG. 2) before it dissipates or "dies down." In contrast, due to its lower frequency, the sonic wave may penetrate further into the wellbore 102 and the formation 106.

As with the sonic acoustic wave, the ultrasonic wave may also be modified by the annular media and the modified ultrasonic wave may be received by the ultrasonic tool 124b. For instance, an amplitude (A), frequency ($\omega$), and/or phase ($\varphi$) of the ultrasonic wave may be modified according to the physical properties of the annular media, thereby resulting in the ultrasonic data, as at 312. The acquired ultrasonic data may be indicative of the density of the annular media.

The ultrasonic data also undergoes a deconvolution operation, as at 314, resulting in de-convoluted amplitude (A), frequency ($\omega$), and phase ($\varphi$) of the modified ultrasonic wave. An ultrasonic-inverse (US-inverse) model may operate on the de-convoluted amplitude (A), frequency ($\omega$), and phase ($\varphi$), as at 316, and may provide a calculation of the density of the annular media, as at 318. As with the S-inverse model, the US-inverse model calculates the density value based on the ratio of the acoustic impedances of the annular media. Because ultrasonic waves may not traverse beyond the casing-cement interface 204, the density of the annular media as calculated by the ultrasonic tool 124b may be the density of the material (or media) at the casing-cement interface 204. The density obtained by the US-inverse model may be optimized and refined (e.g., iteratively), in a similar manner as mentioned above with respect to the S-inverse model.

At 310, the density of the annular media obtained at 308 may be compared with the density of the annular media obtained at 318. If the two density values are not within a desired proximity of each other (e.g., based on a predetermined standard deviation), the S-inverse model and/or the US-inverse model may be updated, as at 309, and the respective density values are recalculated based on an updated S-inverse model and/or an updated US-inverse model. For instance, the corresponding inverse models may predict a different value of acoustic impedance of the annular media and recalculate the density based on the different values. The process may iteratively repeat until the density values are within the desired proximity of each other, and thereby obtaining the density value of the media in the casing-cement interface 204 as measured by the sonic tool 124a, as at 320.

Figure 4A:
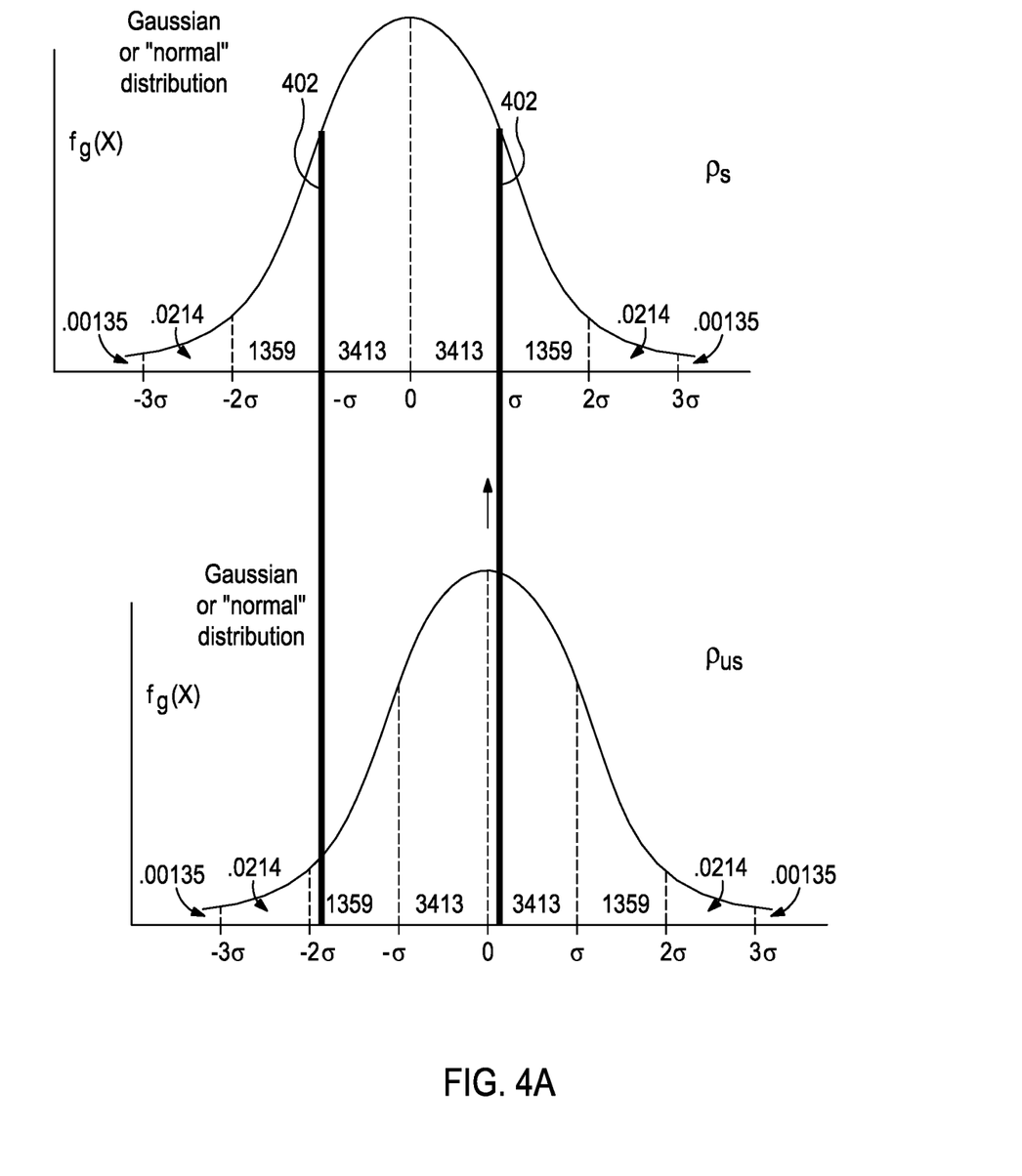
FIGS. 4A-4C are exemplary plots comparing the density values derived from acoustic data.
Figure 4B:
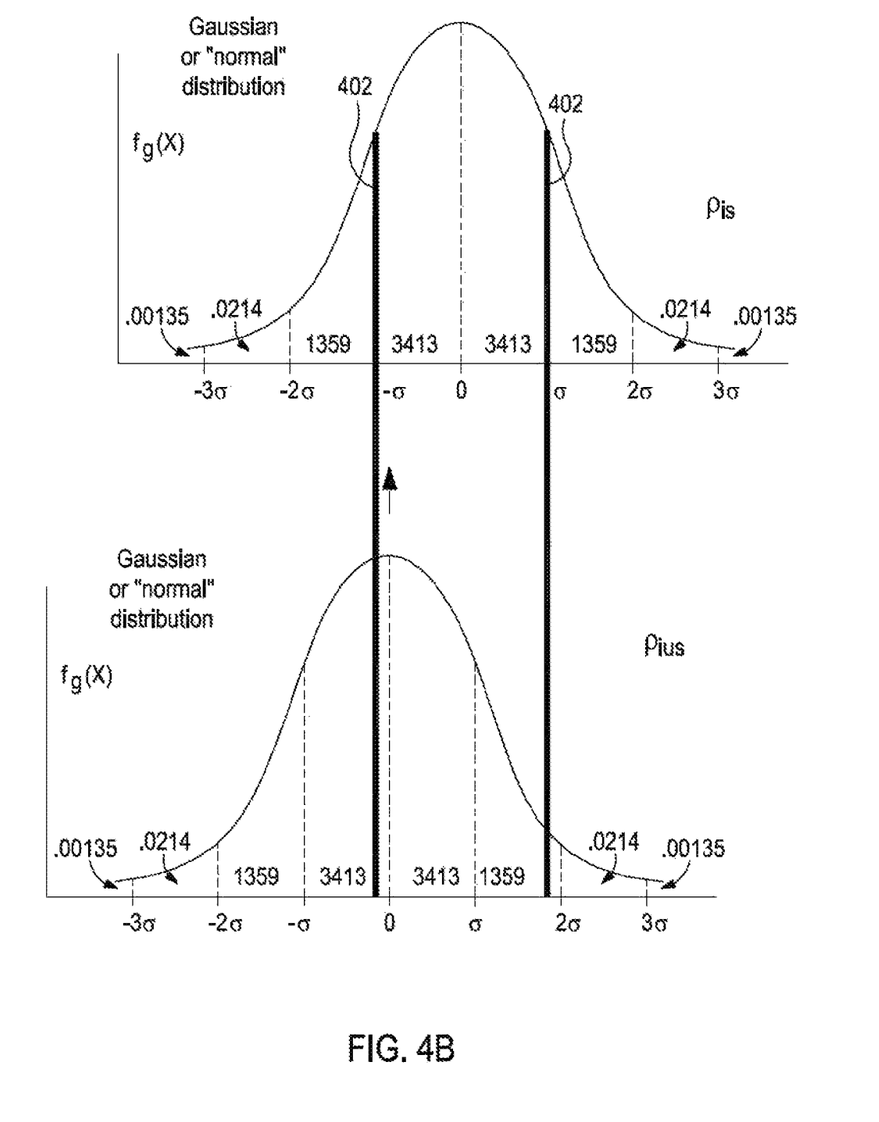
Figure 4C:
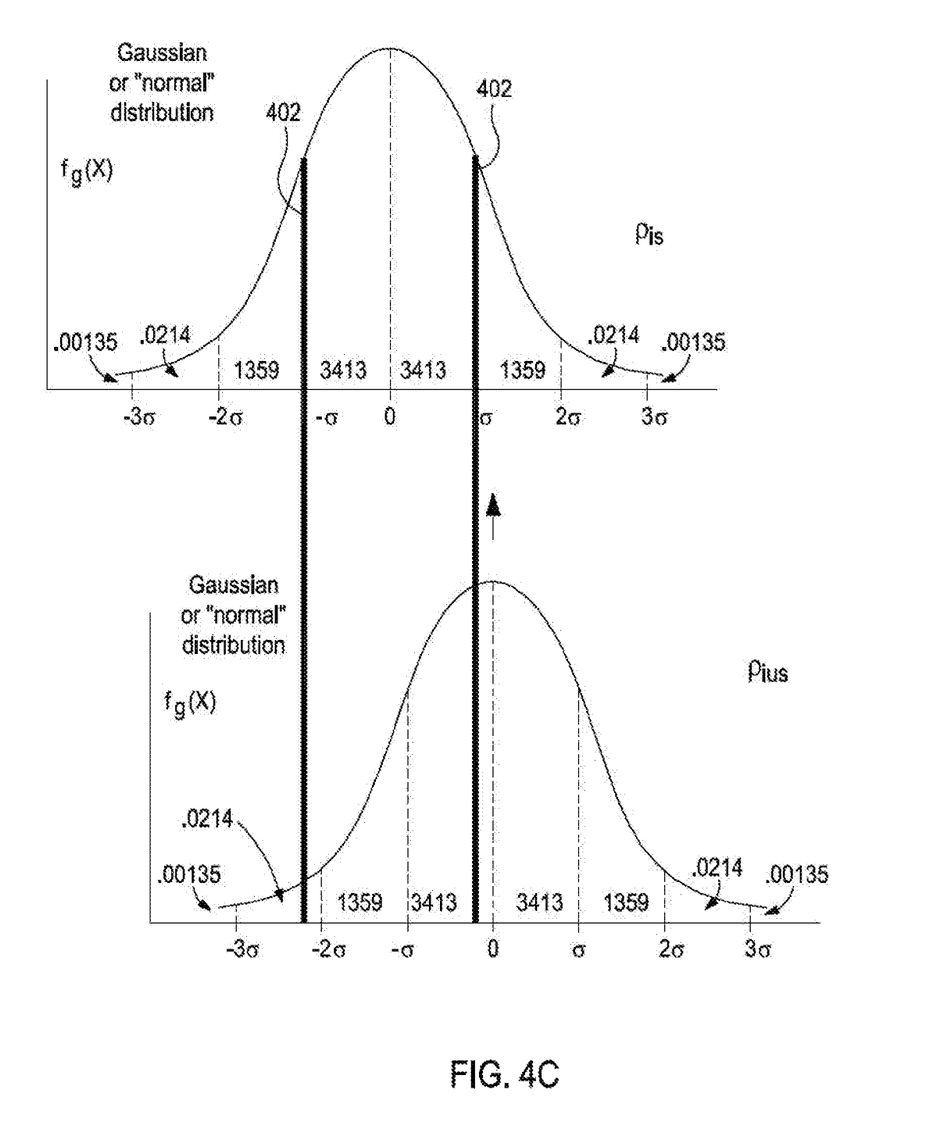

Referring briefly to FIGS. 4A-4C, illustrated are three plots depicting a comparison of example density measurements. The density measurements are illustrated as a Normal (or Gaussian) distribution. In FIG. 4A, the top plot depicts the density measurements ($\rho_S$) obtained from the sonic tool 124a, while the bottom plot depicts the density measurements ($\rho_{US}$) obtained from the ultrasonic tool 124b. The vertical lines 402 represent the acceptable range of standard deviation that may be observed between the two density measurements ($\rho_S$, $\rho_{US}$). As illustrated, the peak of the bell curve of the Normal distribution of the density measurements ($\rho_{US}$) obtained by the ultrasonic tool 124b is within the vertical lines 402. The density measurements ($\rho_{US}$) obtained from the ultrasonic tool 124b and the density measurement ($\rho_S$) obtained from the sonic tool 124a may, therefore, be considered to be within the desired proximity of each other.

In FIG. 4B, the top plot depicts the density measurements ($\rho_{iS}$) obtained from the S-inverse model (as at 306, FIG. 3), while the bottom plot depicts the density measurements ($\rho_{iUS}$) obtained from the US-inverse model (as at 316, FIG. 3). The vertical lines 402 represent the acceptable range of standard deviation that may be observed between the two density measurements ($\rho_{iS}$, $\rho_{iUS}$). As illustrated, the peak of the bell curve of the Normal distribution of the density measurements ($\rho_{iUS}$) obtained from the US-inverse model is within the vertical lines 402. The density measurements ($\rho_{iUS}$) obtained from the US-inverse model may thus be considered to be within the desired proximity of the density measurements ($\rho_{iS}$) obtained from the S-inverse model.

In contrast, in some instances, the density measurements ($\rho_{iUS}$) obtained from the US-inverse model and the density measurements ($\rho_{iS}$) obtained from the S-inverse model may not be considered within the desired proximity of each other.

In FIG. 4C, for instance, the peak of the bell curve of the Normal distribution of $\rho_{i_{US}}$ is outside the vertical lines 402. In this case, the density measurements may have to be recalculated, as mentioned above.

Returning to FIG. 3, the density data is obtained using the density tool 124c of FIG. 1, as at 322. In operation, the density tool 124c emits gamma rays into the wellbore 102, which are scattered by the annular media and the formation 106. Based on the gamma rays returning to the density tool 124c, density data including the far counts, the near counts, and an energy spectrum of the scattered gamma rays is obtained. The density of the annular media may then be calculated based on the density data.

The density data undergoes a deconvolution operation, as at 324, and results in the far counts, the near counts, and the energy spectrum of the scattered gamma rays. As at 326, the results of the deconvolution operation are provided to a density-inverse (D-inverse) model along with the density value of the media in the casing-cement interface 204 as measured by the sonic tool 124a obtained at 320. The D-inverse model may be configured to predict the equivalent density of the annular media using the inputs thereto, as at 328. The equivalent density of the annular media includes the density of the media at the casing-cement interface 204 and the density of the cement 110.

From the equivalent density of the annular media, the density of the media at the casing-cement interface 204 may be predicted, as at 330. For instance, the density of the media at the casing-cement interface 204 may be predicted based on a known density value of the cement 110. As at 334, the density value obtained at 330 may be compared to the density value of the media in the casing-cement interface 204 obtained at 320. If the difference in the two density values is not within a desired proximity of each other (e.g., based on a predetermined standard deviation), the S-inverse model and/or the US-inverse model may be updated, as at 309. The updated model(s) may then recalculate(s) the corresponding density values, and the process iteratively repeats until the density values derived from the S-inverse model and the D-inverse model are within a desired proximity of each other.

Once the density values are within the desired proximity of each other, the density of the media in the casing-cement interface 204 is thereby known and otherwise obtained. In addition, based on the density of the media at the casing-cement interface 204, the width of any "gap" present at the casing-cement interface 204 may be determined, as at 332. Herein, "gap" may refer to any non-solid interface located between the outer diameter of the casing 108 and the cement 110. The workflow method 300 may then terminate with the calculation of the density of the media at the casing-cement interface 204 and a thickness of the annular media, at 336. The presence of a gap at the casing-cement interface 204 may be indicative of a poor cement bond.

Using the workflow method 300, an operator may be able to determine the presence of the gap and may take necessary steps to seal the gap so that fluids from the zones 112a,b or any other undesirable downhole fluids are prevented from migrating to the surface location 104.

Figure 5:
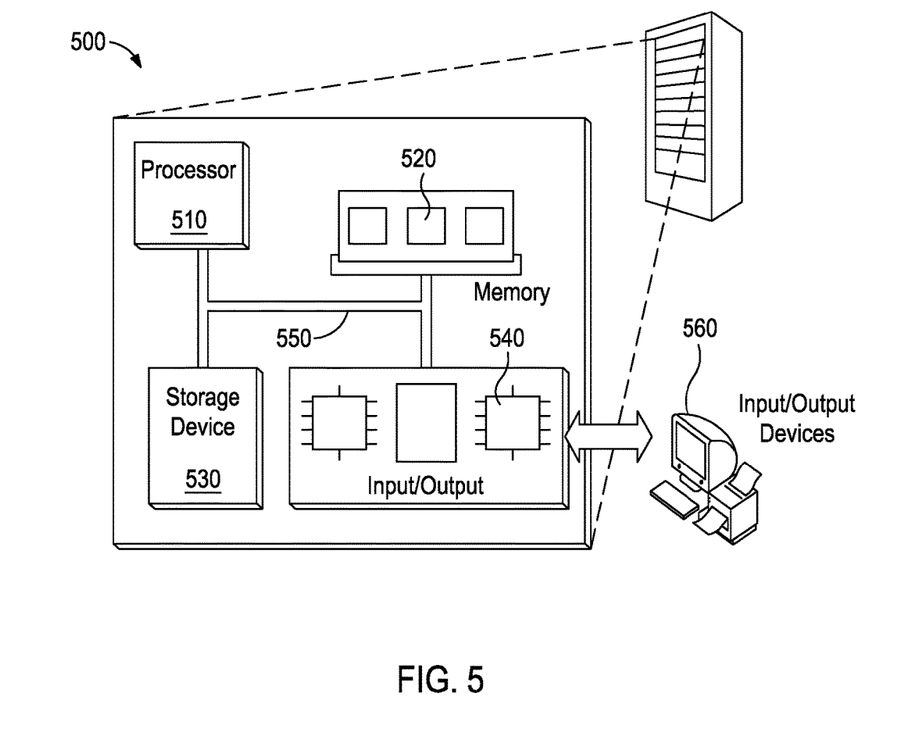
FIG. 5 shows an illustrative processing system for configuring and/or controlling the tool string of FIG. 1 and to implement the workflow of FIG. 3.

FIG. 5 shows an illustrative processing system 500 for configuring and/or controlling the tool string 114 of FIG. 1, and/or to implement the workflow 300 of FIG. 3. The system 500 may include a processor 510, a memory 520, a storage device 530, and an input/output device 540. Each of the components 510, 520, 530, and 540 may be interconnected, for example, using a system bus 550. The processor 510 may be processing instructions for execution within the system 500. In some embodiments, the processor 510 is a single-threaded processor, a multi-threaded processor, or another type of processor. The processor 510 may be capable of processing instructions stored in the memory 520 or on the storage device 530. The memory 520 and the storage device 530 can store information within the computer system 500.

The input/output device 540 may provide input/output operations for the system 500. In some embodiments, the input/output device 540 can include one or more network interface devices, e.g., an Ethernet card; a serial communication device, e.g., an RS-232 port; and/or a wireless interface device, e.g., an 802.11 card, a 3G wireless modem, or a 4G wireless modem. In some embodiments, the input/output device can include driver devices configured to receive input data and send output data to other input/output devices, e.g., keyboard, printer and display devices 560. In some embodiments, mobile computing devices, mobile communication devices, and other devices can be used.

In accordance with at least some embodiments, the disclosed methods and systems related to scanning and analyzing material may be implemented in digital electronic circuitry, or in computer software, firmware, or hardware, including the structures disclosed in this specification and their structural equivalents, or in combinations of one or more of them. Computer software may include, for example, one or more modules of instructions, encoded on computer-readable storage medium for execution by, or to control the operation of, a data processing apparatus. Examples of a computer-readable storage medium include non-transitory medium such as random access memory (RAM) devices, read only memory (ROM) devices, optical devices (e.g., CDs or DVDs), and disk drives.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative, or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be executed on one computer or on multiple computers that are located at one site or distributed across multiple sites and interconnected by a communication network.

Some of the processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors and processors of any kind of digital computer. Generally, a processor will receive instructions and data from a read-only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer may not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations may be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Embodiments disclosed herein include:

A: A method that includes introducing a tool string into a wellbore at least partially lined with casing, wherein an annulus is defined between the casing and the wellbore and is filled with annular media, obtaining sonic data of the annular media using a sonic wave emitted by a sonic tool included in the tool string, performing a first deconvolution operation on the sonic data to obtain an amplitude, a frequency, and a phase of the sonic wave as modified by the annular media, performing a first inverse modeling operation using the amplitude, the frequency, and the phase obtained via the first deconvolution operation to obtain a first density value of the annular media, obtaining ultrasonic data of the annular media using an ultrasonic wave emitted by an ultrasonic tool included in the tool string, performing a second deconvolution operation on the ultrasonic data to obtain an amplitude, a frequency, and a phase of the ultrasonic wave as modified by the annular media, performing a second inverse modeling operation using the amplitude, the frequency, and the phase obtained via the second deconvolution operation to obtain a second density value of the annular media, obtaining density data of the annular media using a density tool included in the tool string, performing a third deconvolution operation on the density data to obtain far counts, near counts, and an energy spectrum of gamma rays scattered by the annular media, and performing a third inverse modeling operation using the far counts, the near counts, and the energy spectrum to obtain a third density value of the annular media.

B: A well system that includes a tool string conveyable into a wellbore drilled through one or more subterranean formations and at least partially lined with casing, wherein an annulus is defined between the casing and the wellbore and filled with an annular media and the tool string includes at least a sonic tool, an ultrasonic tool, and a density tool, and a computer system including a processor and a non-transitory computer readable medium, the computer system being communicatively coupled to the tool string and the computer readable medium storing a computer readable program code that, when executed by the processor, configures the processor to operate the sonic tool to obtain sonic data of the annular media using a sonic wave emitted by the sonic tool, perform a first deconvolution operation on the sonic data to obtain an amplitude, a frequency, and a phase of the sonic wave as modified by the annular media, perform a first inverse modeling operation using the amplitude, the frequency, and the phase obtained via the first deconvolution operation to obtain a first density value of the annular media, operate the ultrasonic tool to obtain ultrasonic data of the annular media using an ultrasonic wave emitted by the ultrasonic tool, perform a second deconvolution operation on the ultrasonic data to obtain an amplitude, a frequency, and a phase of the ultrasonic wave as modified by the annular media, perform a second inverse modeling operation using the amplitude, the frequency, and the phase obtained via the second deconvolution operation to obtain a second density value of the annular media, operate the density tool to obtain density data of the annular media using gamma rays emitted by the density tool, perform a third deconvolution operation on the density data to obtain far counts, near counts, and an energy spectrum of gamma rays scattered by the annular media, and performing a third inverse modeling operation using the far counts, the near counts, and the energy spectrum to obtain a third density value of the annular media.

Each of embodiments A and B may have one or more of the following additional elements in any combination: Element 1: further comprising performing the first inverse modeling operation based on an acoustic impedance characteristic of the annular media. Element 2: further comprising performing the second inverse modeling operation based on an acoustic impedance characteristic of the annular media. Element 3: further comprising comparing the first and second density values to determine whether the first and second density values are within a desired proximity of each other. Element 4: further comprising obtaining a first casing-cement interface density from the first density value when the first and second density values are within the desired proximity, the first casing-cement interface density being a density value of the annular media at an interface of the casing and cement disposed within the annulus. Element 5: further comprising performing the third inverse modeling operation using the first casing-cement interface density. Element 6: further comprising obtaining the third density value based on the first casing-cement interface density. Element 7: further comprising predicting a second casing-cement interface density from the third density value, the second casing-cement interface density being a density value of the annular media at the interface of the casing and the cement disposed within the annulus. Element 8: further comprising comparing the first casing-cement interface density with the second casing-cement interface density to determine whether the first and second casing-cement interface densities are within a desired proximity of each other. Element 9: further comprising recalculating at least one of the first density value and the second density value when the first and second casing-cement interface densities are not within a desired proximity of each other. Element 10: further comprising obtaining a width of the interface of the casing and the cement based on the second casing-cement interface density when the first and second density values are within the desired proximity. Element 11: further comprising recalculating at least one of the first density value and the second density value when the first and second density values are not the desired proximity.

Element 12: wherein the processor is further configured to perform the first inverse modeling operation based on an acoustic impedance characteristic of the annular media. Element 13: wherein the processor is further configured to perform the second inverse modeling operation based on an acoustic impedance characteristic of the annular media. Element 14: wherein the processor is further configured to compare the first and second density values to determine whether the first and second density values are within a desired proximity of each other. Element 15: wherein the processor is further configured to obtain a first casing-cement interface density from the first density value when the first and second density values are within the desired proximity, the first casing-cement interface density being a density value of the annular media at an interface of the casing and cement disposed within the annulus. Element 16: wherein the processor is further configured to perform the third inverse modeling operation using the first casing-cement interface density. Element 17: wherein the processor is further configured to obtain the third density value based on the first casing-cement interface density. Element 18: wherein the processor is further configured to predict a second casing-cement interface density from the third density value, the second casing-cement interface density being a density value of the annular media at the interface of the casing and the cement disposed with in the annulus. Element 19: wherein the processor is further configured to compare the first casing-cement interface density with the second casing-cement interface density to determine whether the first and second casing-cement interface densities are within a desired proximity of each other. Element 20: wherein the processor is further configured to recalculate at least one of the first density value and the second density value when the first and second casing-cement interface densities are not within a desired proximity of each other. Element 21: wherein the processor is further configured to obtain a width of the interface of the casing and the cement based on the second casing-cement interface density when the first and second density values are within the desired proximity. Element 22: wherein the processor is further configured to recalculate at least one of the first density value and the second density value when the first and second density values are not the desired proximity.

By way of non-limiting example, exemplary combinations applicable to A and B include: Element 3 with Element 4; Element 4 with Element 5; Element 4 with Element 6; Element 6 with Element 7; Element 7 with Element 8; Element 8 with Element 9; Element 9 with Element 10; Element 3 with Element 11; Element 14 with Element 15; Element 15 with Element 16; Element 15 with Element 17; Element 17 with Element 18; Element 18 with Element 19; Element 19 with Element 20; Element 19 with Element 21; and Element 14 with Element 22.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method, comprising:
   introducing a tool string into a wellbore at least partially lined with casing, wherein an annulus is defined between the casing and the wellbore and is filled with annular media;

obtaining sonic data of the annular media using a sonic wave emitted by a sonic tool included in the tool string;

obtaining, from the sonic data, an amplitude, a frequency, and a phase of the sonic wave as modified by the annular media;

performing a first inverse modeling operation using the amplitude, the frequency, and the phase to obtain a first density value of the annular media;

obtaining ultrasonic data of the annular media using an ultrasonic wave emitted by an ultrasonic tool included in the tool string;

obtaining, from ultrasonic data, an amplitude, a frequency, and a phase of the ultrasonic wave as modified by the annular media;

performing a second inverse modeling operation using the amplitude, the frequency, and the phase to obtain a second density value of the annular media;

obtaining density data of the annular media using a density tool included in the tool string;

obtaining, from the density data, far counts, near counts, and an energy spectrum of gamma rays scattered by the annular media;

performing a third inverse modeling operation using the far counts, the near counts, and the energy spectrum to obtain a third density value of the annular media; and determining a bond quality between cement in the annular media and the casing based on the first, second, and third density values.

2. The method of claim 1, further comprising performing the first inverse modeling operation based on an acoustic impedance characteristic of the annular media.

3. The method of claim 1, further comprising performing the second inverse modeling operation based on an acoustic impedance characteristic of the annular media.

4. The method of claim 1, further comprising comparing the first and second density values to determine whether the first and second density values are within a desired proximity of each other.

5. The method of claim 4, further comprising obtaining a first casing-cement interface density from the first density value when the first and second density values are within the desired proximity, the first casing-cement interface density being a density value of the annular media at an interface of the casing and cement disposed within the annulus.

6. The method of claim 5, further comprising performing the third inverse modeling operation using the first casing-cement interface density.

7. The method of claim 5, further comprising obtaining the third density value based on the first casing-cement interface density.

8. The method of claim 7, further comprising predicting a second casing-cement interface density from the third density value, the second casing-cement interface density being a density value of the annular media at the interface of the casing and the cement disposed within the annulus.

9. The method of claim 8, further comprising comparing the first casing-cement interface density with the second casing-cement interface density to determine whether the first and second casing-cement interface densities are within a desired proximity of each other.

10. The method of claim 9, further comprising recalculating at least one of the first density value and the second density value when the first and second casing-cement interface densities are not within a desired proximity of each other.

11. The method of claim 10, further comprising obtaining a width of the interface of the casing and the cement based on the second casing-cement interface density when the first and second density values are within the desired proximity.

12. The method of claim 4, further comprising recalculating at least one of the first density value and the second density value when the first and second density values are not the desired proximity.

13. A well system, comprising:

a tool string conveyable into a wellbore drilled through one or more subterranean formations and at least partially lined with casing, wherein an annulus is defined between the casing and the wellbore and filled with annular media and the tool string includes at least a sonic tool, an ultrasonic tool, and a density tool; and a computer system including a processor and a non-transitory computer readable medium, the computer system being communicatively coupled to the tool string and the computer readable medium storing a computer readable program code that, when executed by the processor, configures the processor to:

operate the sonic tool to obtain sonic data of the annular media using a sonic wave emitted by the sonic tool;

obtain, from the sonic data, an amplitude, a frequency, and a phase of the sonic wave as modified by the annular media;

perform a first inverse modeling operation using the amplitude, the frequency, and the phase to obtain a first density value of the annular media;

operate the ultrasonic tool to obtain ultrasonic data of the annular media using an ultrasonic wave emitted by the ultrasonic tool;

obtain, from the ultrasonic data, obtain an amplitude, a frequency, and a phase of the ultrasonic wave as modified by the annular media;

perform a second inverse modeling operation using the amplitude, the frequency, and the phase to obtain a second density value of the annular media;

operate the density tool to obtain density data of the annular media using gamma rays emitted by the density tool;

obtain, from the density data, far counts, near counts, and an energy spectrum of gamma rays scattered by the annular media;

perform a third inverse modeling operation using the far counts, the near counts, and the energy spectrum to obtain a third density value of the annular media; and determining a bond quality between cement in the annular media and the casing based on the first, second, and third density values.

14. The system of claim 13, wherein the processor is further configured to perform the first inverse modeling operation based on an acoustic impedance characteristic of the annular media.

15. The system of claim 13, wherein the processor is further configured to perform the second inverse modeling operation based on an acoustic impedance characteristic of the annular media.

16. The system of claim 13, wherein the processor is further configured to compare the first and second density values to determine whether the first and second density values are within a desired proximity of each other, and obtain a first casing-cement interface density from the first density value when the first and second density values are within the desired proximity, the first casing-cement interface density being a density value of the annular media at an interface of the casing and cement disposed within the annulus.

17. The system of claim 16, wherein the processor is further configured to perform the third inverse modeling operation using the first casing-cement interface density.

18. The system of claim 16, wherein the processor is further configured to obtain the third density value based on the first casing-cement interface density.

19. The system of claim 18, wherein the processor is further configured to predict a second casing-cement interface density from the third density value, the second casing-cement interface density being a density value of the annular media at the interface of the casing and the cement disposed with in the annulus, and compare the first casing-cement interface density with the second casing-cement interface density to determine whether the first and second casing-cement interface densities are within a desired proximity of each other.

20. The system of claim 19, wherein the processor is further configured to recalculate at least one of the first density value and the second density value when the first and second casing-cement interface densities are not within a desired proximity of each other.

21. The system of claim 19, wherein the processor is further configured to obtain a width of the interface of the casing and the cement based on the second casing-cement interface density when the first and second density values are within the desired proximity.

22. The system of claim 16, wherein the processor is further configured to recalculate at least one of the first density value and the second density value when the first and second density values are not the desired proximity.

* * * * *